US005756280A

United States Patent [19]

Soora et al.

[11] Patent Number: 5,756,280
[45] Date of Patent: May 26, 1998

[54] MULTIMEDIA DISTRIBUTION NETWORK INCLUDING VIDEO SWITCH

[75] Inventors: Gopalaswamy Soora, Cary; Vernon Lawton Tice, Holly Springs, both of N.C.

[73] Assignee: International Business Machines Corporation, Armonk, N.Y.

[21] Appl. No.: 538,764

[22] Filed: Oct. 3, 1995

[51] Int. Cl.⁶ .................................................. H04N 7/173
[52] U.S. Cl. .............................. 455/4.2; 455/5.1; 348/12; 348/7
[58] Field of Search ........................ 348/7, 12, 13, 348/706, 722, 6; 455/4.2, 4.1, 5.1; 395/200.47, 200.09

[56] References Cited

U.S. PATENT DOCUMENTS

| 5,130,793 | 7/1992 | Bordry et al. | 348/705 |
| 5,132,789 | 7/1992 | Ammon | 348/12 |
| 5,412,416 | 5/1995 | Nemirofsky | 348/10 |
| 5,512,936 | 4/1996 | Burton | 348/11 |
| 5,515,511 | 5/1996 | Nguyen et al. | 348/7 |
| 5,526,034 | 6/1996 | Hoarty et al. | 348/7 |
| 5,544,161 | 8/1996 | Bingham et al. | 348/7 |
| 5,581,479 | 12/1996 | McLaughlin et al. | 455/4.2 |

*Primary Examiner*—Victor R. Kostak
*Attorney, Agent, or Firm*—John D. Flynn; George E. Clark

[57] ABSTRACT

A multimedia information distribution system includes one or more servers, each server having access to a database storing multimedia information for distribution to subscribers, each of the servers connected to a network such as an Asynchronous transfer Mode (ATM) packet switching network, a number of switching points connected to the network, each switching point accepting digital information from the ATM network and under the control of a resource manager providing one or more multimedia information streams through a coaxial switching network to one or more modems, wherein each modem is connected to a user's terminal by existing transmission media such as telephone twisted pair wires using Asynchronous Digital Subscriber Line (ADSL). In an alternate embodiment, the digital switching may be distributed using a hybrid fiber coaxial (HFC) cable technique to extend effective range of transmission.

15 Claims, 5 Drawing Sheets

MULTIMEDIA DISTRIBUTION NETWORK INCLUDING VIDEO SWITCH

BACKGROUND OF THE INVENTION

1. Field of the Invention.

The present invention relates to information handling systems, and more particularly to information handling systems for distributing a large number of multimedia information streams, to a large number of users.

2. Prior Art.

In the prior art there are many solutions for delivering multimedia information over transmission media such as copper twisted pair to end users. One such prior art technique employs an asymmetrical modem technology referred to as Asymmetrical Digital Subscriber Line (ADSL). ADSL is described in detail in the American National Standards Institute Draft Standard for Telecommunications-Network and Installation Interfaces-Asymmetrical Digital Subscriber Line (ADSL) Interface-ANSI Document No. T1.413 which is incorporated herein.

Another technique currently under consideration by ANSI as a standard is referred to as Very high speed Digital Subscriber Line (VDSL) (ANSI Document T1E1.4/95-041R1).

Although the prior art will be described herein with reference to ADSL, it should be understood that VDSL can be substituted for ADSL where appropriate. VDSL provides higher bandwidth transmission over short distances as compared to ADSL.

A typical prior art system includes one or more data servers delivering multimedia data through a backbone network to a digital switch located at a central distribution point. Each output of the digital switch is connected to an ADSL modem. The ADSL modem has a direct point-to-point connection to a user's premises ADSL modem.

Using ADSL technology, multimedia data could be delivered to homes using existing twisted pair transmission lines. However, the prior art techniques present several problems. Among these are:

1. Digital switches with high speed digital ports are expensive resources, and since a digital port is dedicated to each ADSL line, the switch represents a large investment for the service provider when the total number of individual subscriber lines is considered. For example, if there are 240 multimedia information streams available for user selection, the switch must be able to handle the 240 inputs plus any interactive streams being used. If there are 24,000 users, and only 10% or 2400 concurrently use interactive services, this still requires the switch to be able to handle these interactive streams in addition to the multimedia information streams. If a technology such as OC-3 is used, which handles 24 streams per line (assuming 6 Mbps per stream), there are 110 OC-3 inputs and 1000 OC-3 outputs required for the switch. Thus, the prior art ADSL solution is much more expensive when compared to other solutions such as tuned coaxial cable transmission.

2. Bandwidth supported in an ADSL modem is dependent upon distance between the modem pair. The greater the distance, the less the bandwidth the modem pair can support. Prior art ADSL (based on ADSL-2 technology) can support up to six Mbps with a distance of 9,000 to 12,000 feet (depending upon the size of the wire used in the twisted pair). As bandwidth requirement for transmission increases, the allowable distance between the modem pair decreases.

Referring to FIG. 1, a prior art information handling system for distribution of multimedia information will be described.

A prior art multimedia information distribution system 10 includes a number of servers 12, each connected to one of a number of databases such as database 14 and database 16 providing sources of multimedia information. Each server 12 is connected to a network 18 such as an asynchronous transmission mode (ATM) network. Also connected to network 18 is one or more central distribution stations 20 each of which including a digital switch 22 having a plurality of digital ports 24, each connected to one of a plurality of asymmetrical digital subscriber line modems (ADSL) 26. Each modem 26 is connected by a transmission medium such as a copper twisted pair wire 28 to a subscriber's terminal 30, sometimes referred to as a set top terminal (STT). In a typical prior art system, distribution point 20 may be a central office of a local telephone service provider. The output of digital switches 22 are connected to modems 26 which are occasionally referred to as service provider equipment SPE ADSL modems 26. Each of the modems 26 has a direct point-to-point connection to the user's terminal 30. The user terminal 30 is occasionally referred to as customer premise equipment or CPE.

The prior art system 10 which employs ADSL technology can deliver multimedia information to a user's terminal using existing copper twisted pair. However, this prior art system has a number of drawbacks, among which are:

First, the high speed digital ports 24 in digital switch 22 are expensive, and since a digital port is required for each ADSL line, a large investment is required since one port is required for each ADSL line. A typical configuration might be 1000 user terminal for each digital switch. This would require 1000 digital ports 24, resulting in a very high cost digital switch.

This results in the prior art system 10 being very expensive when compared to other techniques such as tuned coaxial cable transmission.

Second, the bandwidth supported by the ADSL modem 26 is dependent upon the distance between the modem pair at the central office 20 and the user terminal 30. The greater the distance between the modem pair, the less the bandwidth which can be supported. Prior art ADSL modems 26, based on ADSL-2 technology, can support up to six Mbps over a distance of 9,000 to 12,000 feet depending upon the size of the wire in twisted pair 28. As the bandwidth requirement increases, the distance over which the multimedia information may be transmitted is greatly reduced.

A second example of a prior art multimedia distribution system is shown in FIG. 2.

A switch node 200 has inputs 202 for interactive services and 204 for broadcast services.

If a technology such as OC-3 is used, there may be 110 OC-3 inputs (100 OC-3s for 2400 interactive streams and 10 OC-3s for 240 broadcast streams, where each OC-3 line handles 24 streams) and 1000 OC-3 outputs required for the switch (assuming 24000 user terminals).

If there are 240 multimedia information streams available for user selection, the switch must be able to handle the 240 inputs plus any interactive streams being used. If there are 24,000 users, and only 10% or 2400 concurrently use interactive services, this still requires the switch to be able to handle these interactive streams 202 in addition to the broadcast multimedia information streams 204. Each of the 1000 OC-3 output lines of switch node 200 is connected by optical cable to a remote demultiplexer 208 which splits out the 24 streams transmitted on the OC-3 line to 24 ADSL ports 210, where each ADSL port is connected to a user terminal 30 by twisted pair lines 28 (See FIG. 1).

There has been a significant amount of activity with respect to "video on demand" and "interactive television" services in the past several years. The following prior art systems are representative of some of this ongoing development.

European Patent Publication 0624039A2 describes a system for delivering audio and/or video signals to users in connection with interactive television services. Sources of signals are connected to a digital network which may be a packet network. Also connected to the network are processors for control of applications and interfaces to distribution arrangements such as cable television systems and telephone subscriber loops. For each user, there is a signal converter at the user's premises, a transmission medium to a central point, and an interface converter to convert from the transmission medium to the packet switch.

The publication discloses a packet network which may be implemented as an asynchronous transfer mode (ATM) network with links which are implemented in the serial optical network (SONET-3) technology.

Although the publication generally relates to a system which includes ATM transmission, the publication does not teach nor suggest sharing an analog transmission medium to multiple concentrators where each concentrator converts digital ATM signals to ADSL. Further, since the "upstream" interface is typically fiber to the curb (FTTC), ATM or SONET, the publication does not recognize nor suggest the structure or technique taught and claimed herein with reference to the present invention.

Taiwan (Republic of China) Patent 227077 teaches a multimedia distribution system including a central terminal and a user terminal, further including a fiber switch star network architecture where the central terminal executes video switching to select channels. The system uses a tuning converter at the central terminal to select one video signal from multiple multiplexed signals and transmits only the selected video signal to the user terminal.

This patent appears to teach the fiber to the curb (FTTC) system. The patent does not identify a hybrid fiber coax structure as is taught and claimed with respect to the present invention.

U.S. Pat. No. 5,303,229 teaches an optical fiber telecommunications network having an optical network unit provided in the subscriber neighborhood for terminating the optical fiber transmission line and providing electrical signals over metallic lines such as twisted pair copper to the subscribers.

Since the patent teaches the use of the FTTC for a small number of subscribers (8–20), the patented technique has limited use with respect to the currently installed base of twisted pair lines. The multimedia distribution system taught and claimed with respect to the present invention allows a larger number of users to be serviced with existing twisted pair lines.

U.S. Pat. No. 5,387,927 teaches a method for transmitting broad band video services from a broad band digital signal source including forming the digital signal from the source in a plurality of channels of digital signals and modulating the plurality of carrier signals with respect to channels of the digital signals. The channels are then multiplexed to form a combined signal which is used to modulate light from a laser light source. The modulated light source is transmitted on a fiber link to a local distribution box where it is converted to electrical signals and broadcast to a number of subscribers' set top terminals.

The patent does not teach nor suggest the transmission of analog broadcast signals concurrently with distribution of digital signals over a medium which is adapted for use of currently installed twisted pair lines to subscribers and the use of fiber optic lines to extend distances and coax to readily implement multidrop configurations.

The following patents all relate to various implementations of ADSL distribution: U.S. Pat. Nos. 5,247,347; 5,408,260; 5,341,474; 5,371,532.

Although each of the above-identified patents relates to an ADSL distribution system, none of the patents teach nor suggest the invention as taught and claimed herein with respect to the present invention.

Another group of patents generally relates to integrated or interactive television communication systems. Among these are U.S. Pat. Nos. 5,319,455; 5,361,091; 4,290,142.

As above, none of these patents teach nor suggest a multimedia distribution network as taught and claimed herein with respect to the present invention.

SUMMARY OF THE INVENTION

Therefore, it is an object of the present invention to efficiently distribute multimedia information streams by a distribution system which includes transmission of a large number of multimedia information streams to a large number of users, where each user can select any of the information streams.

Accordingly, a multimedia information distribution system includes at least one source of multimedia information streams; one or more switch nodes, each switch node connected to at least one source of the multimedia information streams for receiving at least one stream of multimedia information and for providing the multimedia information stream to at least one output of each switch node, each switch node including one or more switch ports, each having at least one input connected to a source of multimedia information streams; a first plurality of modems each having an input connected to at least one of the switch ports; a concentrator circuit for concentrating outputs of the modems to an output of the concentrator circuit; a transmission medium connected to the output of the concentrator circuit; and a second plurality of modems each having an input connected to the transmission medium, a first group of the second plurality of modems having at least one output connected to a user terminal.

An alternative embodiment also includes a second group of the second plurality of modems, each modem in said second group having at least one output connected to one of at least one of a plurality of networks, each network connected to at least one user terminals.

Other features and advantages of the present invention will become apparent in the following detailed description of the preferred embodiment of the invention taken in conjunction with the accompanying drawings.

DETAILED DESCRIPTION OF PREFERRED EMBODIMENTS OF THE INVENTION

FIRST EMBODIMENT OF THE PRESENT INVENTION

The present invention as described herein solves the problems identified above with respect to prior art systems. By using coaxial cable tuning techniques in combination with the ADSL modem, digital ports 24 can be shared by a number of compressed digital information streams, for example, six 6 Mbps streams can be supported by each digital port. By delivering multimedia information using coaxial cable and converting it to twisted pair closer to the user terminal, the bandwidth supported can be much greater than the six Mbps of the prior art (another example of a high bandwidth technique is VDSL, discussed in the Background of the Invention, above).

Figure 1:
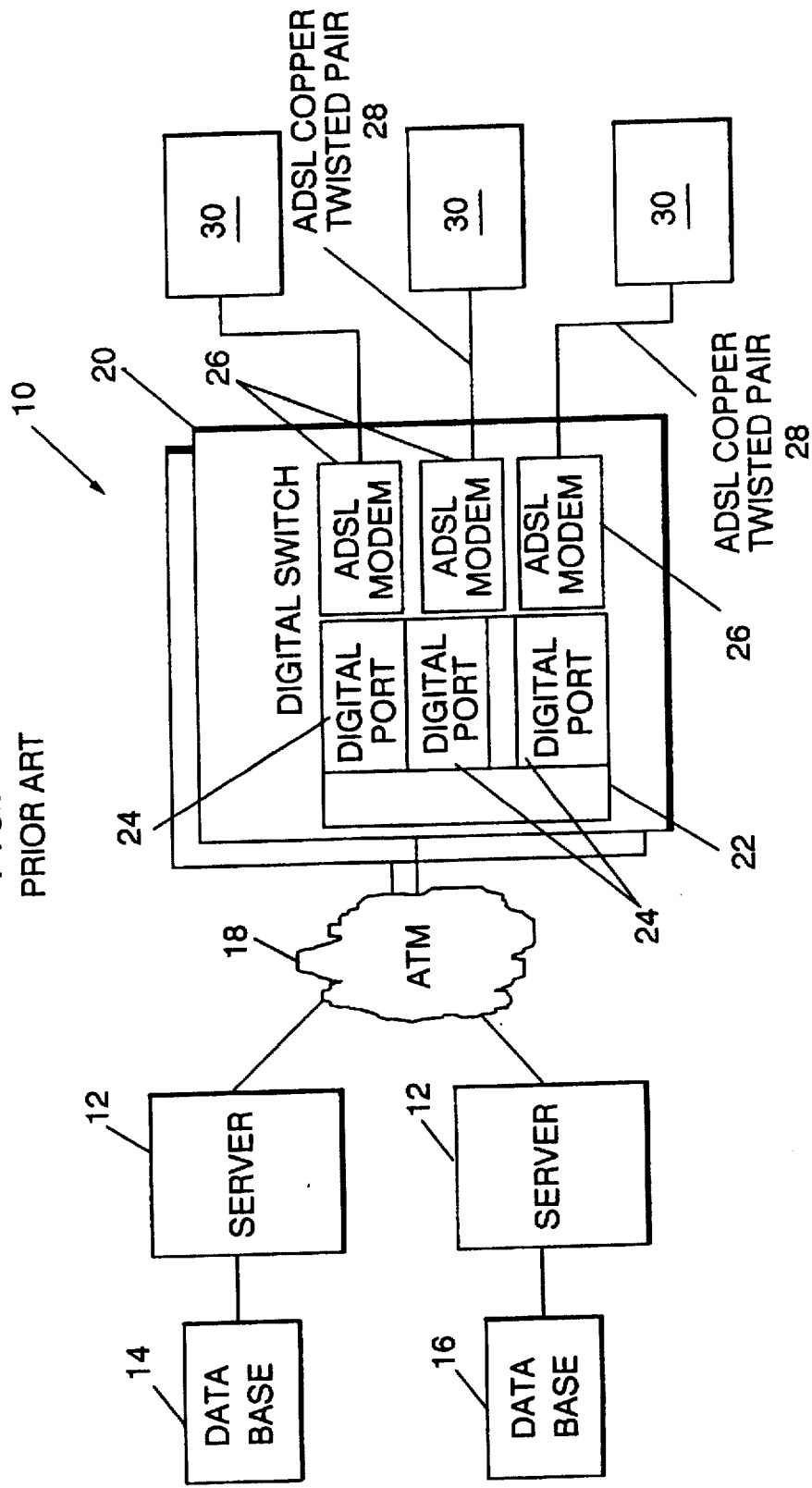
FIG. 1 is a block diagram of one example of a prior art information handling system for distribution of multimedia information.
Figure 2:
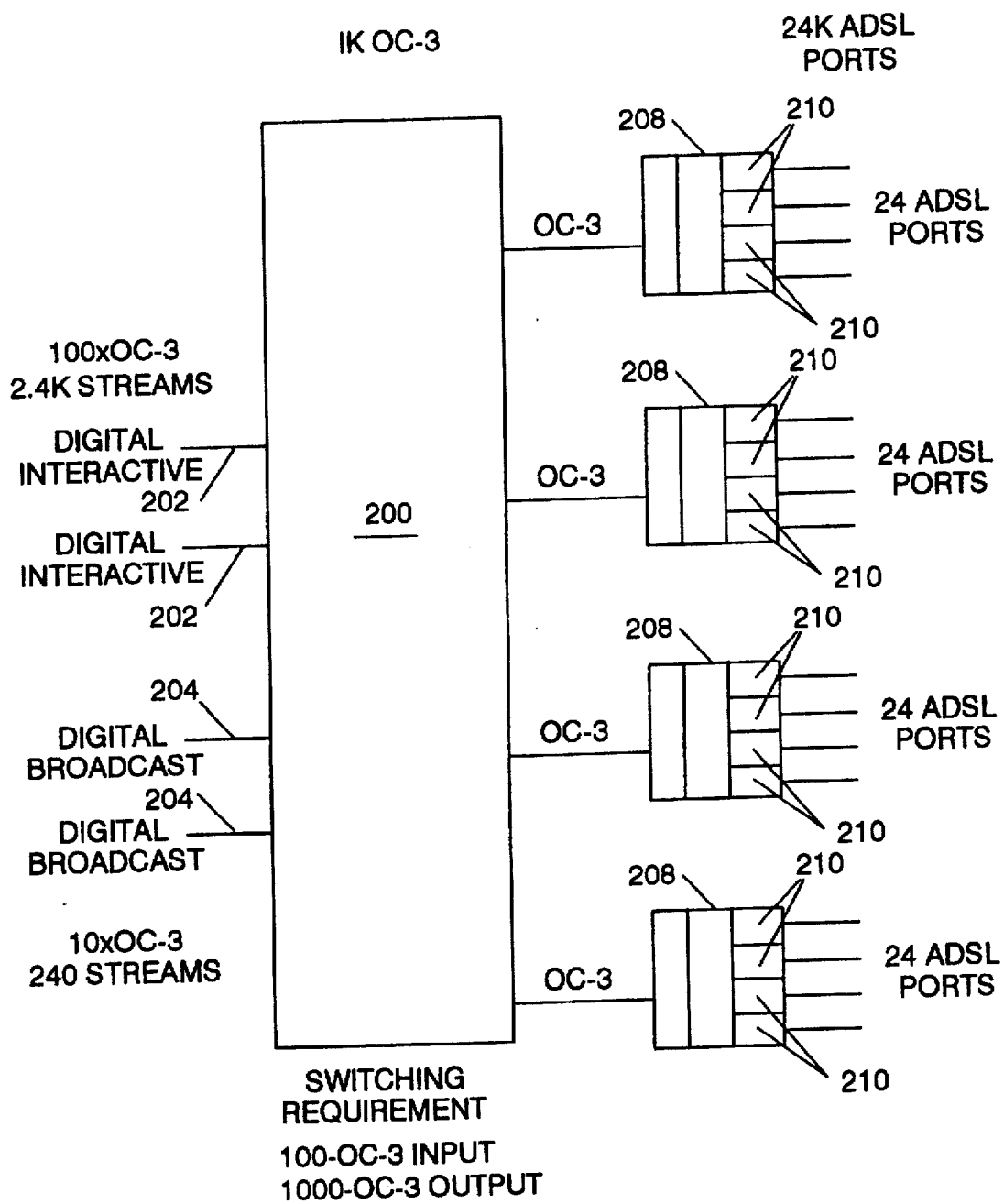
FIG. 2 is a block diagram of a second example of a prior art information handling system for distribution of multimedia information.
Figure 3:
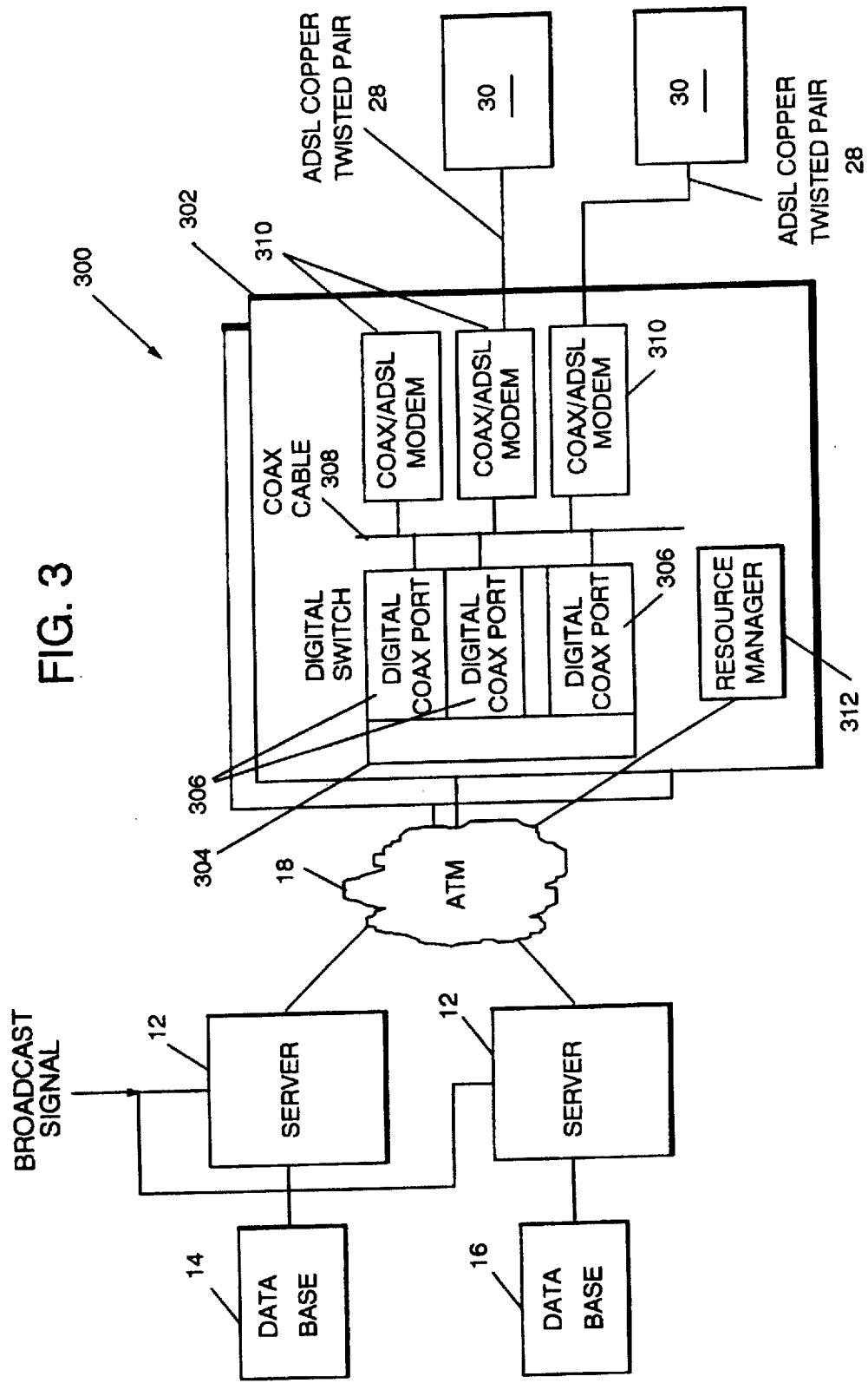
FIG. 3 is a block diagram of an information handling system in accordance with a first embodiment of the present invention.

Referring now to FIG. 3, a first embodiment of the present invention will be described.

As in prior art multimedia distribution systems, a number of servers 12 each connected to a database 14, 16 and to one or more sources of broadcast multimedia information provide requested multimedia information streams through network 18 to a central distribution point 302 which includes a digital switch 304 having a number of digital coax ports 306. In addition to stored multimedia information in database 14, 16, each server 12 may have access to realtime broadcast information which may also be requested by a user terminal 30. Each of the digital coax ports 306 has an output which is connected to a coaxial cable bus 308 to which are also connected inputs of coax/ADSL modems 310. It should be noted that the number of digital ports 306 and the number of coax/ADSL modems 310 are generally not the same. The number of digital ports 306 may be determined by the number of different multimedia information streams which may be requested, whereas, the number of modems 310 is determined by the number of users requiring simultaneous service. For example, for 240 multimedia information streams, there may be a need for as few as 10 digital coax ports 306, since each digital coax port 306 can handle 24 compressed multimedia information streams concurrently using OC-3 technology. The output of each coax/ADSL modem 310 is connected by existing transmission medium such as copper twisted pair 28 to a similar ADSL modem at the user terminal 30.

Control of the connections between digital coax ports 306 and coax/ADSL modems 310 in central distribution point 302 is handled by resource manager 312 which receives routing and other information such as start time for the multimedia stream from one of servers 12 based upon user request.

Figure 4:
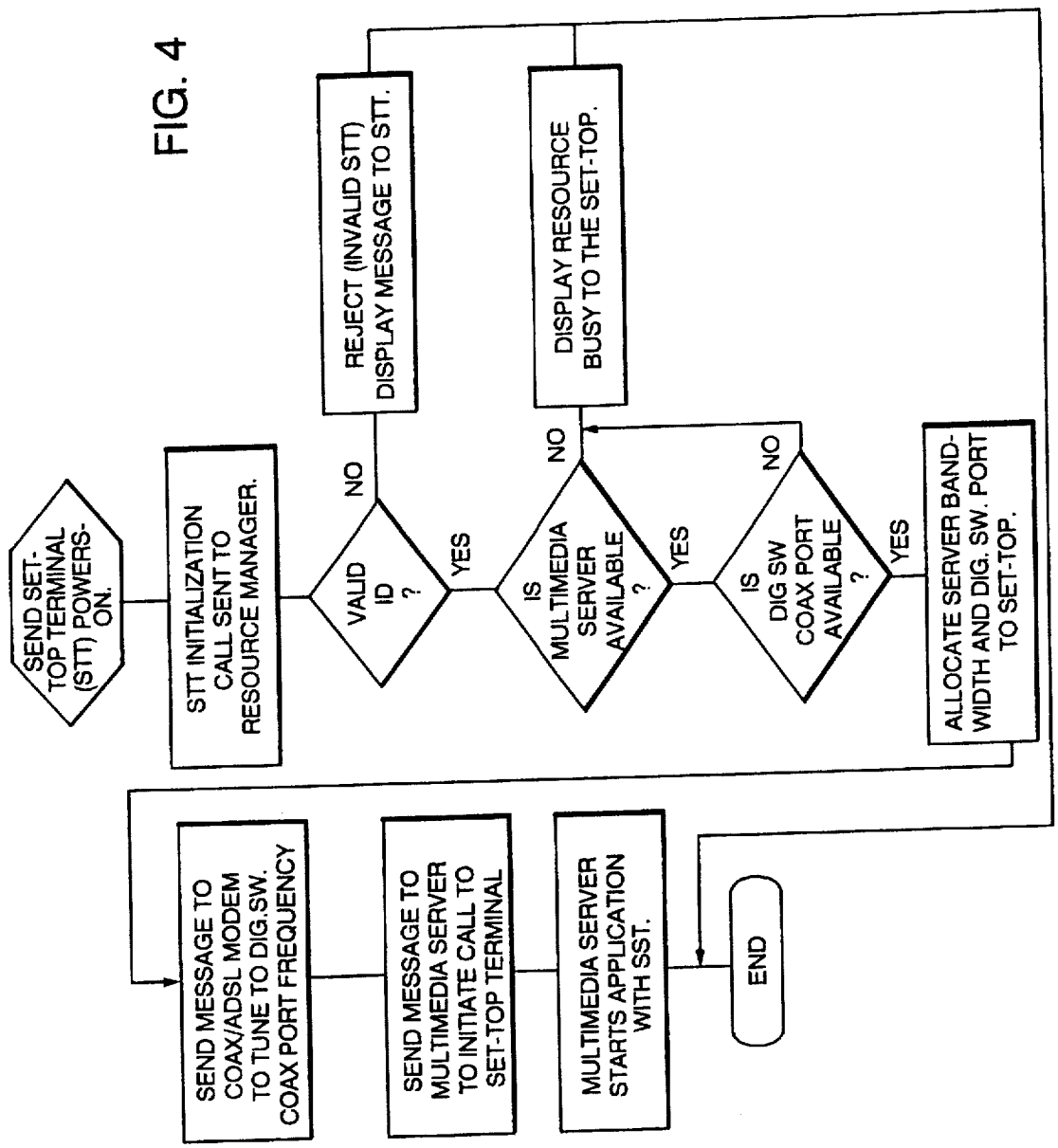
FIG. 4 is a flow chart illustrating the operation of the resource manager shown in FIG. 3 in accordance with the present invention.

The control functions of resource manager 312 will be described with respect to FIG. 4.

When a user terminal 30 powers ON, a user terminal initialization call is sent to resource manager 312. The user terminal ID is checked for validity. If the ID is not valid, the call is rejected and an error message is displayed. If the ID is valid, server 12 is checked for availability. If server 12 is not available, a resource busy message is sent to the user terminal and displayed. If server 12 is available, digital coax ports 306 are checked for availability. If no digital coax port is available, the resource busy message is sent to the user terminal and displayed. If a digital coax port is available, a portion of the server 12 bandwidth and a digital coax port are allocated to the requesting user terminal 30. Resource manager 312 then sends a message to coax/ADSL modem 310 to tune to the frequency of the allocated digital coax port. Resource manager 312 then sends a message to server 12 to initiate a call to user terminal 30. Server 12 then commences the communication with user terminal 30 to deliver the requested multimedia information stream.

An important aspect of the present invention is the combination of tuned coaxial cable switching and ADSL. Using ADSL, the existing installed base of twisted pair transmission media can be used for multimedia distribution at minimum cost. By using coaxial cable tuning at the distribution point 302, digital ports 306 may be shared such that there no longer needs to be a one-to-one correspondence between the digital ports 306 and the modems 310 as was required in prior art systems.

Also, for a typical coax/ADSL modem 310, a digital bandwidth of approximately 38 Mbps can be transmitted over each 6 Mhz analog channel. Thus, if a typical compressed video stream requires up to 6 Mbps, 6 compressed video streams may be carried in each analog channel.

Each coax/ADSL modem 310 performs several functions in system 300. The first is to demodulate and demultiplex multiple multimedia information streams that are delivered to modem 310. The second is to deliver the multimedia stream to user terminal 30 across twisted pair 28. The multimedia information streams may be carried using ATM cells. When ATM cells are being used, each ATM cell may carry multimedia traffic such as multimedia information streams as well as non-multimedia traffic such as control information, voice, etc.

Using a combination of coaxial cable tuning and ADSL modems 310, the number of digital coax ports is reduced to a number of active multimedia information streams required during peak busy hours of service. In a typical network deployment, there may only be 30 percent of users requiring service during a peak busy time. If each user requires only a single multimedia information stream, using the present invention as embodied herein with six information streams being transmitted per channel, only five digital coax ports 306 would be required for each 100 users connected to system 300.

For interactive TV applications, a portion of digital port 306, typically one-sixth of an analog channel capacity, need be dedicated to a specific interactive TV application. Resource manager 312 controls allocation and deallocation of digital coax ports 306 on user requests for interactive TV service.

SECOND EMBODIMENT OF THE PRESENT INVENTION

Figure 5:
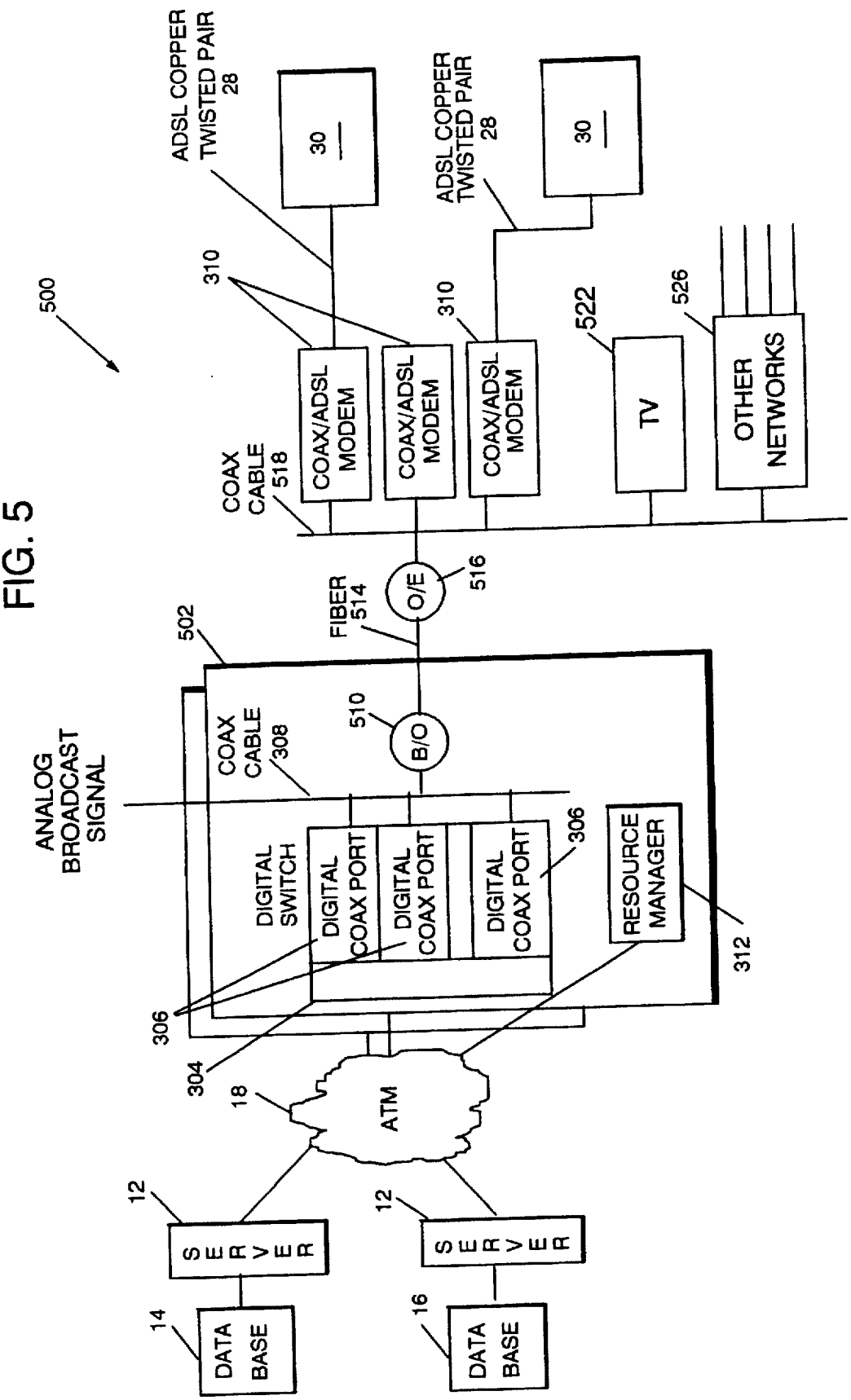
FIG. 5 is a block diagram of an information handling system in accordance with a second embodiment of the present invention.

Referring now to FIG. 5, a second embodiment of the present invention useful in extending the distance between the central point 502 and user terminals 30 while maintaining adequate bandwidth will be described.

If bandwidth requirement increases, one technique for maintaining the appropriate bandwidth/distance relationship is to decrease the distance between the ADSL modem pairs 310 and 30 across copper twisted pairs 28 (see FIG. 3). By moving the coax/ADSL modems 310 out of the central distribution point 302 to a point in a neighborhood closer to the user terminals, higher bandwidth can be achieved. In this configuration, the modem pairs may be implemented with VDSL modems as described above in the Background of the Invention.

The embodiment shown with respect to FIG. 5 is similar to that shown in FIG. 3 in that servers 12, databases 14, 16, network 18, digital switch 304 including digital coax ports 306, coaxial cable bus 308, and resource manager 312 are all essentially the same as was discussed above with respect to the embodiment shown in FIG. 3. However, the second embodiment 500 of the present invention includes a converter 510 connected to coaxial cable bus 308 for converting the electrical signals on bus 308 to optical signals for transmission across optical fiber 514 to a complementary converter 516 located in the neighborhood of user's terminals 30. Complementary converter 516 converts the optical signals received from fiber optic transmission medium 514 to electrical signals which are then transmitted by a second coaxial cable bus 518 to inputs to coax/ADSL modems 310 which, as previously described, are connected point-to-point to user terminals 30 by twisted pair lines 28. It should be noted that the complementary converter 516 may also connect to other neighborhood coaxial cable buses 518 or may act as an optical repeater to extend the optical fiber cable to other groups of users.

This wiring configuration is referred to as a hybrid fiber cable (HFC) distribution system. The coaxial cable part of this configuration may be tapped and used to service analog TV users.

A typical system may have a bandwidth of 700 Mhz usable for transmission of multimedia streams. If each analog channel has a bandwidth of 6 Mhz, the system can handle about 116 channels. Approximately 40 channels are reserved for analog broadcast signals (standard TV broadcasts for use by analog TV users, which may be attached to the hybrid fiber cable distribution system by standard coaxial cable), leaving 70+ channels for transmission of compressed digital multimedia information streams. Since each channel can transmit 6 compressed digital multimedia information streams, there are about 420 streams available to digital user terminals 30 attached by ADSL to the multimedia information distribution system. Any of the 420 digital multimedia information streams may be selected by the user terminal 30.

One or more tunable TV receivers 522 may be connected to transmission medium coaxial cable bus 518 for direct reception of analog broadcast signals. TV receiver 522 has the capability of tuning to each analog channel.

Additionally, banks of modems 526 may be connected to coaxial cable bus 518 to distribute information streams to other networks, such as, shared LANs, switched LANs, multipoint networks, PTP networks, STAR networks, or any net with any topology or any protocol.

It will be appreciated that although a specific embodiment of the present invention has been described herein for the purposes of illustration, various modifications may be made without departing from the spirit or scope of the invention.

Accordingly, the scope of this invention is limited only by the following claims and their equivalents.

What is claimed is:

1. A multimedia information handling system comprising:
a data transmission network;
one or more database servers, for distributing multimedia information to subscribers; each of the servers connected to said network;
one or more switching nodes connected to said network, each switching node receiving one or more streams of multimedia information from said network and providing said one or more multimedia information streams at one or more outputs of said nodes, each said switching node comprising:
one or more switching ports, connected to inputs of said switching node;
one or more modems, and
an analog switching network connecting outputs of said switching ports to inputs of said modems, each modem adapted to be connected to a user terminal by a first transmission medium.

2. A multimedia information handling system according to claim 1, further comprising:
a resource manager for controlling routing of said multimedia information streams to said user terminals.

3. A multimedia information handling system comprising:
a data transmission network;
one or more database servers, for distributing multimedia information to subscribers; each of the servers connected to said network;
one or more switching nodes connected to said network, each switching node receiving one or more streams of multimedia information from said network and providing said one or more multimedia information streams at one or more outputs of said nodes, each said switching node comprising:
one or more switching ports, connected to inputs of said switching node;
one or more modems, and
an analog switching network connecting outputs of said switching ports to inputs of said modems, each modem adapted to be connected to a user terminal by a first transmission medium;
a first transmission converter connected to said analog switching network;
a second transmission medium having a first end thereof connected to said first transmission converter; and
a second transmission converter connected to a second end of said second transmission medium for extending a distance between said switching nodes and said user terminals.

4. A multimedia information handling system according to claim 3, wherein said first and second transmission converters employ a hybrid fiber coaxial cable technique to extend a range of transmission.

5. A multimedia information handling system according to claim 3, wherein said first and second transmission converters comprise:
electrical to optical signal converters.

6. A multimedia information handling system according to claim 3, further comprising:
one or more groups of modems, connected to said second transmission medium for distribution of multimedia information to said user terminals.

7. A switching node for switching multimedia information streams between one or more sources and one or more user terminals, comprising:
one or more switching ports, connected to inputs of said switching node;
one or more modems, and
a coaxial switching network connecting outputs of said switching ports to inputs of said modems, each modem adapted to be connected to a user terminal by a first transmission medium.

8. A switching node according to claim 7, further comprising:
a resource manager for controlling routing of said multimedia information streams to said user terminals.

9. A switching node according to claim 7, further comprising:

a first transmission converter connected to said coaxial switching network;

a second transmission medium connected to a first end of said first transmission converter; and a second transmission converter connected to a second end of said second transmission medium for extending a distance between said switching nodes and said user terminals.

10. A switching node according to claim 9, wherein said first and second transmission converters employ a hybrid fiber coaxial cable technique to extend a range of transmission.

11. A switching node according to claim 9, wherein said first and second transmission converters comprise:

electrical to optical signal converters.

12. A multimedia information distribution system comprising:

at least one source of a plurality of multimedia information streams;

one or more switching nodes, each switching node connected to at least one source of the plurality of multimedia information streams for receiving at least one stream of multimedia information from said source and for providing said at least one multimedia information stream to at least one output of each said switching node, each said switching node comprising:

one or more switch ports, each having at least one input connected to a source of multimedia information streams;

a first plurality of modems each having an input connected to at least one of the switch ports;

a concentrator circuit for concentrating outputs of said first plurality of modems to an output of the concentrator circuit;

a transmission medium connected to the output of the concentrator circuit; and a second plurality of modems each having an input connected to said transmission medium, a first group of said second plurality of modems having at least one output adapted to be connected to a user terminal.

13. A multimedia information distribution system according to claim 12, wherein said second plurality of modems further comprises:

a second group of said second plurality of modems, each modem in said second group having at least one output connected to one of at least one of a plurality of networks, each said network connected to at least one user terminals.

14. A multimedia information distribution system according to claim 12, wherein each said switching node further comprises:

a plurality of modulators, each modulator having an input connected to an output of one of the first plurality of modems and an output connected to an input of the concentrator circuit.

15. A multimedia information distribution system according to claim 14, wherein each said modulator modulates the outputs of a connected modem to a different frequency.

* * * * *